(12) United States Patent
Petrak et al.

(10) Patent No.: US 12,344,128 B2
(45) Date of Patent: Jul. 1, 2025

(54) VEHICLE CONTROL SYSTEM AND METHOD

(71) Applicant: Transportation IP Holdings, LLC, Norwalk, CT (US)

(72) Inventors: Edward Thomas Petrak, Millcreek, PA (US); Ajith Kuttannair Kumar, Erie, PA (US); Jeffrey John Wolff, Girard, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 897 days.

(21) Appl. No.: 17/526,186

(22) Filed: Nov. 15, 2021

(65) Prior Publication Data

US 2022/0289074 A1 Sep. 15, 2022

Related U.S. Application Data

(60) Provisional application No. 63/160,455, filed on Mar. 12, 2021.

(51) Int. Cl.
*B60L 9/00* (2019.01)
*B60L 9/12* (2006.01)
(Continued)

(52) U.S. Cl.
CPC ............ *B60L 9/005* (2013.01); *B60L 9/00* (2013.01); *B60L 9/12* (2013.01); *B60L 15/32* (2013.01);
(Continued)

(58) Field of Classification Search
CPC .......... B60M 3/02; B60M 1/30; B60M 7/003; B60M 3/00; H02M 1/12; B60L 9/12;
(Continued)

(56) References Cited

U.S. PATENT DOCUMENTS

| 9,008,879 B2 | 4/2015 | Kumar et al. |
| 9,983,593 B2 | 5/2018 | Cooper et al. |
| 2017/0353138 A1* | 12/2017 | Zhang ............... H02P 27/06 |

FOREIGN PATENT DOCUMENTS

| EP | 0267548 A2 | 5/1988 |
| GB | 2537020 A | 10/2016 |

(Continued)

OTHER PUBLICATIONS

Extended European Search Report for corresponding EP Application No. 22155007.5 dated Aug. 2, 2022 (7 pages).

(Continued)

*Primary Examiner* — Zachary L Kuhfuss
(74) *Attorney, Agent, or Firm* — K&L Gates LLP (57) ABSTRACT

A method and system include determining a resonant frequency of a vehicle system operably coupled with an external power source that provides voltage and current to the vehicle system. A first filter extracts a phase or a frequency component from the voltage provided by the external power source to generate a stabilizing voltage component. A second filter extracts a phase or a frequency component from the current provided by the external power source to generate a stabilizing current component. The stabilizing voltage component is out of phase with the stabilizing current component. A control input of a converter device of the vehicle system is determined based on the stabilizing voltage component, the stabilizing current component, and the resonant frequency. The stabilizing voltage component, the stabilizing current component, and the control input are communicated with the converter device to change the resonant frequency of the vehicle system.

20 Claims, 7 Drawing Sheets

(51) Int. Cl.
  *B60L 15/32* (2006.01)
  *B60L 50/53* (2019.01)
  *B60M 1/30* (2006.01)
  *B60M 3/00* (2006.01)
  *B60M 3/02* (2006.01)
  *B60M 7/00* (2006.01)
  *H02J 3/01* (2006.01)

(52) U.S. Cl.
  CPC .............. *B60L 50/53* (2019.02); *B60M 1/30* (2013.01); *B60M 3/00* (2013.01); *B60M 3/02* (2013.01); *B60M 7/003* (2013.01); *H02J 3/01* (2013.01); *B60L 2200/26* (2013.01)

(58) Field of Classification Search
  CPC ...... B60L 2200/26; B60L 50/53; B60L 9/005; B60L 15/32; B60L 15/002; H02J 3/002; H02J 3/01; H02J 3/381; H02J 2310/48; B61C 3/00

USPC ......................................................... 307/9.1
See application file for complete search history.

(56) References Cited

FOREIGN PATENT DOCUMENTS

JP        H05211702 A      8/1993
JP        2017169444 A     9/2017

OTHER PUBLICATIONS

Notification of European Publication Number and Information on the Application of Article 67(3) EPF for corresponding EP Application No. 22155007 dated Aug. 18, 2022 (2 pages).
Office Action for corresponding JP Application No. 2022-016563 dated Jul. 12, 2023 (9 pages).

* cited by examiner

VEHICLE CONTROL SYSTEM AND METHOD

CROSS-REFERENCE TO RELATED APPLICATIONS

This application claims priority to U.S. Provisional Application No. 63/160,455 (filed 12 Mar. 2021), the entire disclosure of which is incorporated herein by reference.

BACKGROUND

Technical Field

The subject matter described herein relates to control systems and methods of vehicle systems.

Discussion of Art

In applications in which vehicles receive power from an external power source, such as a catenary line, electrified rail, etc., link oscillations and instability may result from inductive-capacity input filtering, transients on the external power source (e.g., from grid infrastructure), power transients, other vehicles and/or equipment electrically coupled with the catenary, or the like. For example, link oscillations may be caused by current and voltage swings. Also, oscillations may result from stationary charging infrastructure, such as automatic or manually electric plug connections. If a battery is present on the vehicle, oscillations may result between grid infrastructure and the battery. Instances of link instability may cause breakers to trip, may require vehicles or equipment to be installed with protective circuits, or the like.

As one example for stabilizing the link oscillations, connection systems may include an inductive-capacitive filter that may be used to provide more stable connection and disconnection transitions, to dampen transient effects, or the like. However, when coupled with typical inverter control dynamics, the link between the vehicle or equipment and the catenary becomes undampened and potentially unstable when the natural frequency is excited. The natural frequency may become excited, for example, when a vehicle connects or disconnects from the catenary, when a power or tractive effort by a vehicle changes, when power efforts by equipment operably coupled with the catenary changes, or the like. Existing active dampening control strategies may be used such as by using link voltage passed through a band-pass filter, which is then superimposed as a component of torque regulation, for example, to cancel or reduce the instability. The superimposed link voltage may be used to dampen natural frequencies when the natural frequencies are known or expected. However, additional or alternative dampening measures may be required for situations in which component and/or controller variations may be unknown, or different from what is expected.

It may be desirable to have a system and method that stabilizes link oscillations that differs from those currently in use.

BRIEF DESCRIPTION

In one or more embodiments, a method includes determining a resonant frequency of a vehicle system operably coupled with an external power source. The external power source may provide voltage and current to the vehicle system. A stabilizing voltage component is formed from the voltage and a stabilizing current component is formed from the current using plural filters. A first filter extracts one or more of a phase or a frequency component from the voltage provided by the external power source to generate the stabilizing voltage component. A second filter extracts one or more of a phase or a frequency component from the current provided by the external power source to generate the stabilizing current component. The stabilizing voltage component is out of phase with the stabilizing current component. A control input of a converter device of the vehicle system is determined based on the stabilizing voltage component, the stabilizing current component, and the resonant frequency. The stabilizing voltage component, the stabilizing current component, and the control input are communicated with the converter device. The stabilizing voltage component, the stabilizing current component, and the control input change the resonant frequency of the vehicle system.

In one or more embodiments, a control system includes a sensor configured to detect a resonant frequency of a vehicle system operably coupled with an external power source. The external power source provides voltage and current to the vehicle system. Plural filters are configured to form a stabilizing voltage component from the voltage and a stabilizing current component from the current. A first filter of the plural filters extracts one or more of a phase or a frequency component from the voltage provided by the external power source to generate the stabilizing voltage component. A second filter of the plural filters extracts one or more of a phase or a frequency component from the current provided by the external power source to generate the stabilizing current component. The stabilizing voltage component is out of phase with the stabilizing current component. One or more processors are configured to determine a control input of a converter device of the vehicle system based on the stabilizing voltage component, the stabilizing current component, and the resonant frequency. The one or more processors communicate the stabilizing voltage component, the stabilizing current component, and the control input with the converter device of the vehicle system. The stabilizing voltage component, the stabilizing current component, and the control input change the resonant frequency of the vehicle system.

In one or more embodiments, a method includes determining a resonant frequency of a vehicle system operably coupled with an external power source. The external power source provides voltage and current to the vehicle system. A stabilizing voltage component is formed from the voltage and a stabilizing current component is formed from the current using plural filters. A first filter extracts one or more of a phase or a frequency component of the voltage provided by the external power source to generate the stabilizing voltage component. A second filter extracts one or more of a phase or a frequency component of the current provided by the external power source to generate the stabilizing current component. The stabilizing voltage component is 90 degrees out of phase with the stabilizing current component. A control input of a converter device of the vehicle system is determined based on the stabilizing voltage component, the stabilizing current component, and the resonant frequency. The stabilizing voltage component, the stabilizing current component, and the control input are communicated with the converter device. The stabilizing voltage component, the stabilizing current component, and the control input generate a responsive frequency configured to counteract or interact with the resonant frequency of the vehicle system to change the resonant frequency of the vehicle system.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relates to a vehicle system and a method of controlling a vehicle system, e.g., controlling or changing a resonant frequency (of an electrical power system) of the vehicle system. The vehicle system may be operably coupled with an external power source and may receive current and voltage (e.g., electrical power) from the external power source to power one or more systems or components of the vehicle system.

The vehicle system may include plural electrical filters that may receive the voltage and current, and may form stabilizing voltage and current components from the voltage and current, respectively. For example, a first filter may change a phase of the voltage to form a stabilizing voltage component, and a second filter may change a phase of the current to form a stabilizing current component. The stabilizing current component is out of phase with the stabilizing voltage component. For example, the phase of the stabilizing current component may be 90 degrees out of phase with the phase of the stabilizing voltage component.

The controller may determine a control input of a converter device of the vehicle system based on the stabilizing voltage component and the stabilizing current component. For example, the control input may control one or more operational settings of the vehicle system, such as a torque generated by the drive system, a speed of a blower device, or the like. The controlled may communicate the stabilizing voltage and current components and the control input with the converter device to change a resonant frequency of the vehicle system. For example, the stabilizing voltage and current components and the control input may together form a stabilizing compensation that is configured to be a responsive frequency that counteracts and/or interacts with the resonant frequency in order to change the resonant frequency. For example, the stabilizing compensation may reduce or dampen the resonant frequency. For example, the resonant frequency depends, in part, on the output of the converter, and when the converter is operated according to the stabilizing voltage component, the stabilizing current component, and the control input, the resonant frequency changes.

While some embodiments described herein relate to trolley vehicles, not all embodiments of the inventive subject matter are restricted to trolley vehicles. One or more embodiments of the inventive subject matter may relate to other types or models of vehicles, such as automobiles, trucks, buses, mining vehicles, marine vessels, aircraft (manned or unmanned, such as drones), agricultural vehicles, or other off-highway vehicles that may receive power from an external power source. Additionally, the vehicles may be included in vehicle systems that may include two or more different types of vehicles that may operate as a common vehicle system and that may communicate with each other and/or the off-board control system.

Figure 1:
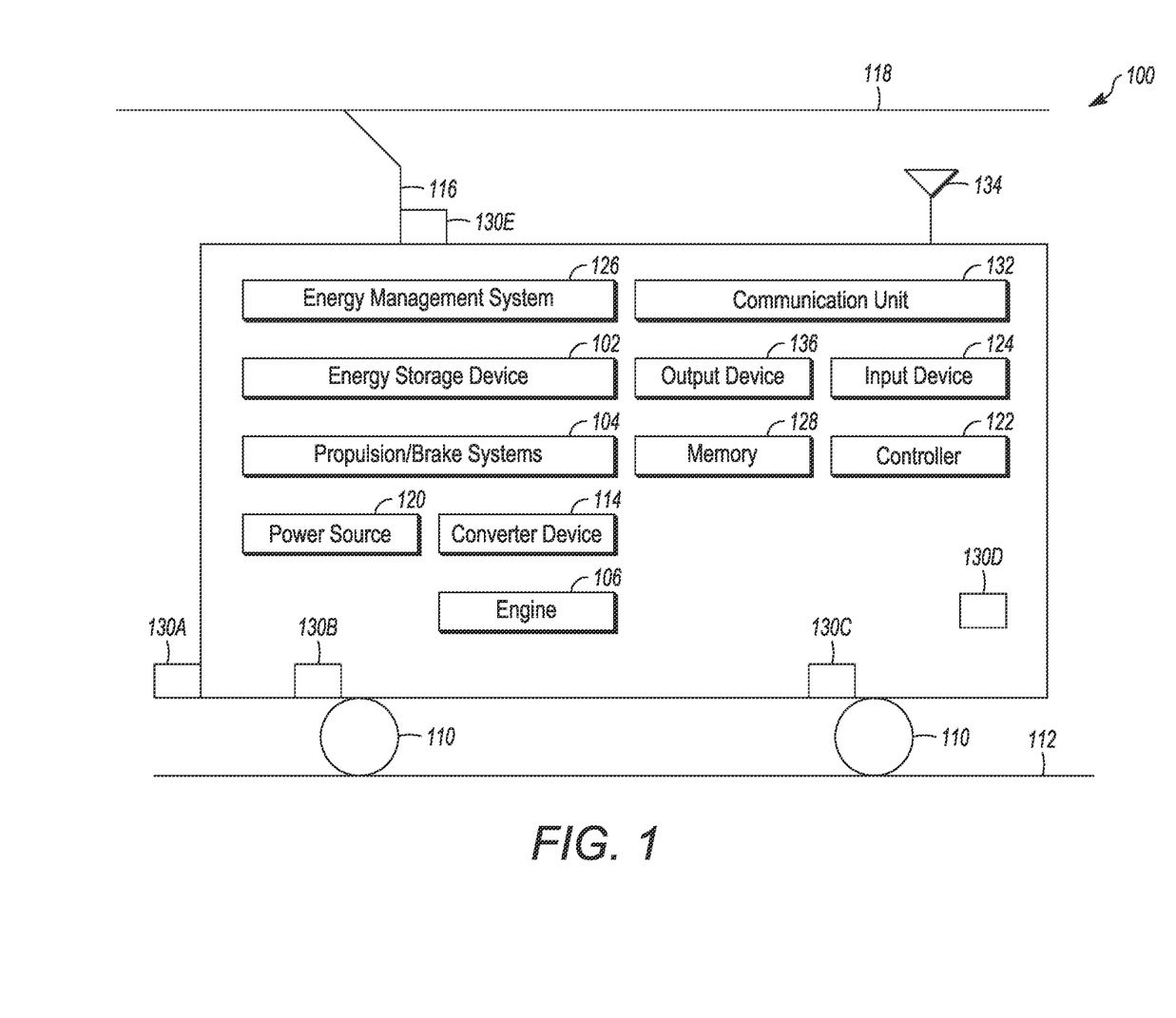
FIG. 1 illustrates one example of a vehicle system in accordance with one embodiment.

FIG. 1 illustrates one example of a vehicle system 100. The vehicle system includes a controller 122 disposed onboard the vehicle system. The controller may represent a control module, and can include one or more processors, microcontrollers, or other logic-based devices and/or associated software or instructions, for carrying out one or more operations described herein. The controller controls operations of the vehicle system, such as by controlling tractive efforts and/or braking efforts provided by a propulsion and braking systems 104. The controller may be manually operated by receiving instruction signals from an input device 124 (e.g., a device that receives input from an operator such as, but not limited to, a touchscreen, a joystick, a keyboard, a switch, a wheel, a microphone, or the like) based on manually input from an operator at the input device. An output device 136 (e.g., a display, monitor, touchscreen, speaker, light, or the like) can provide information to the operator, such as current operational settings of the vehicle system, designated operational settings of a trip plan (as described below), a current amount of electric energy stored onboard the vehicle system, a current storage capacity of an onboard energy storage device 102, or the like.

In one or more embodiments, the controller may be automatically operated to autonomously control operations of the vehicle system. For example, a trip plan may be provided by an energy management system 126 and/or stored in a tangible and non-transitory computer readable storage medium, or memory 128, that is accessible by the controller. The controller and the energy management system may represent two or more control modules in one or more embodiments. The trip plan may designate operational settings of the vehicle system as a function of time or distance along the route for a trip of the vehicle system to a destination location. The designated operational settings of the trip plan may be established in order to reduce one or more of fuel consumed, emissions generated, or time spent in transit by the vehicle system for the trip. The energy management system may include one or more processors, microcontrollers, or other logic-based devices, and/or associated software or instructions, for carrying out one or more operations described herein.

The tractive components operably coupled with the propulsion and/or brake systems (e.g., traction motors, brakes such as air brakes, or the like) may control movement of the wheels 110 (and/or axles joined to the wheels, not shown) of the vehicle system to generate tractive efforts that propel the vehicle along a route 112. In addition to providing propulsive force to propel the vehicle system, the propulsion and/or brake systems can act to slow or stop movement of the vehicle system using dynamic braking.

The propulsion and/or brake systems may be electrically powered by electric energy (e.g., electric current) supplied by one or more onboard and/or off-board power sources. For example, the vehicle system may be referred to as hybrid vehicle system such that the vehicle system may be powered by an off-board external power source, an onboard power source, or a combination of the external and onboard power sources. With respect to an onboard power sources, the vehicle system may include an onboard energy storage device 102 and/or a power source 120 such as one or more fuel cells, batteries, or the like. The onboard power sources also or alternatively can include one or more onboard energy sources (not shown) that generates electric current onboard the vehicle. For example, the onboard energy source may include a generator and/or alternator that may be connected to an engine 106 by a shaft. Rotation of the shaft by the engine rotates a rotor of the generator to create electric energy (e.g., electric current).

In one or more embodiments, the onboard energy sources may include another type of device that generates or stores electric energy onboard the vehicle, such as one or more solar cells, wind turbines, or the like. In another example, the onboard energy sources may include the traction motors of the propulsion system when the traction motors operate in a dynamic braking mode where electric energy is generated by the traction motors during slowing of the vehicle system. At least some electric energy generated by the dynamic braking can be provided to the onboard energy storage device for storage. Additionally or alternatively, the energy generated by dynamic braking may be used for other regenerated uses, battery use, to power other auxiliary systems and head end power, such as coach lighting and air conditioning, or the like, of the vehicle system, or other vehicles operably coupled with the vehicle system.

While the onboard energy storage device is shown as being disposed onboard the vehicle system and operably coupled with the propulsion and brake systems, alternatively, the onboard energy storage device may be disposed onboard another vehicle that is coupled with the vehicle system 100. For example, the energy storage device may be located on an energy tender vehicle that is connected with the vehicle system 100 by one or more mechanical connections such that movement of the vehicle system also moves the tender vehicle. Such an energy storage device can be connected with the propulsion system of the vehicle system by one or more conductive bodies (e.g., buses, cables, wires, or the like).

The energy storage device can directly supply electric current to the traction motors of the propulsion system to power the motors by being directly coupled with the traction motors (e.g., with no intermediate conductive buses, transformer, or the like, disposed between the energy storage device and the motors). Alternatively or additionally, the energy storage device can indirectly supply the electric current to the traction motors by conveying the current to the motors through one or more conductive buses, transformers, or the like. Optionally, the energy storage device can directly and/or indirectly supply electric current to a blower motor inverter of the vehicle system (not shown), to a converter device 114, or the like. Optionally, the energy storage device may directly and/or indirectly supply electric current to one or more different vehicles operably coupled with (e.g., mechanically and/or logically) the vehicle system to power one or more systems of the different vehicles.

In one or more embodiments, the vehicle system may receive electric current from an external power source 118. For example, one or more systems of the vehicle system may be electrically connected with one or more conductive pathways that extend alongside the route being traveled by the vehicle system. In the illustrated embodiment of FIG. 1, an overhead catenary may supply electric energy to an interface device of the vehicle system, such as a pantograph 116 of the vehicle system. As another example, a powered portion of the route, such as an electrified rail, can represent interface equipment that provides electric energy to a shoe (not shown) or other interface device. The electric energy that is received through the interface devices of the vehicle system can be used to charge the onboard energy storage device, power one or more systems of the vehicle system (e.g., blower motors, traction motors, braking devices, or the like), or the like. For example, a drive system of the propulsion system may be operated with energy from the external power source.

One or more sensors 130 may be disposed onboard the vehicle system. The sensors may output signals indicative of vehicle characteristics, characteristics of different systems and/or components of the vehicle system, environmental conditions, or the like. The output signals may be communicated (e.g., wired or wirelessly) to the controller. In one or more embodiments, the controller may determine a state of one or more systems of the vehicle system. Optionally, the controller may communicate the output signals to an off-board controller or control system via the output device, may communicate the output signals to an operator of the vehicle system, or the like.

The sensors may be temperature sensors, accelerometers, tachometers, cameras, voltmeters, ammeters, torque sensors, pressure sensors, incline meters or alternative gravity relation sensors, or the like. For example, a sensor 130A may be a camera that captures still images and/or video of an area outside of the vehicle system or maybe a load cell that captures payload measurements of a payload operably coupled with the vehicle system. Optionally, a sensor 130B and a sensor 130C may sense characteristics of the wheels (e.g., suspension and/or tire pressure, axle and/or wheel rotational speeds, or the like). Optionally, a sensor 130D may be disposed within an operator cab of the vehicle system and may sense characteristics of the cab (e.g., operator seat movement or bounce, environmental conditions of the cab, capture still images and/or video within the cab and/or images outside of the cab through a window of the cab, or the like). Optionally, a sensor 130E may be operably coupled with the pantograph and may measure characteristics of the electric energy directed into the vehicle system from the external power source. Optionally, the vehicle system may include any additional and/or alternative sensors disposed at one or more different locations onboard and/or off-board the vehicle system to measure characteristics of the vehicle system.

In one or more embodiments, the vehicle system is electrically coupled with the external power source via the pantograph such that the external power source provides voltage and current to the vehicle system. While electrically coupled, the external power source may introduce a natural resonant frequency (e.g., a frequency that happens or occurs organically or naturally without outside input) to the vehicle system. For example, the catenary connection may be unstable such that the external power source link may cause oscillations, link voltage transients, link current transients, or the like.

In one or more embodiments, the resonant frequency may change, such as by becoming excited, responsive to another vehicle coupling with and/or decoupling from the external power source, a change in the number of vehicles electrically coupled with the external power source, or the like. Additionally, the resonant frequency may be a growing instability such that the instability of the resonant frequency may continue to increase (e.g., worsen) if there is no dampening to counteract or interact with the resonant frequency.

Figure 2:
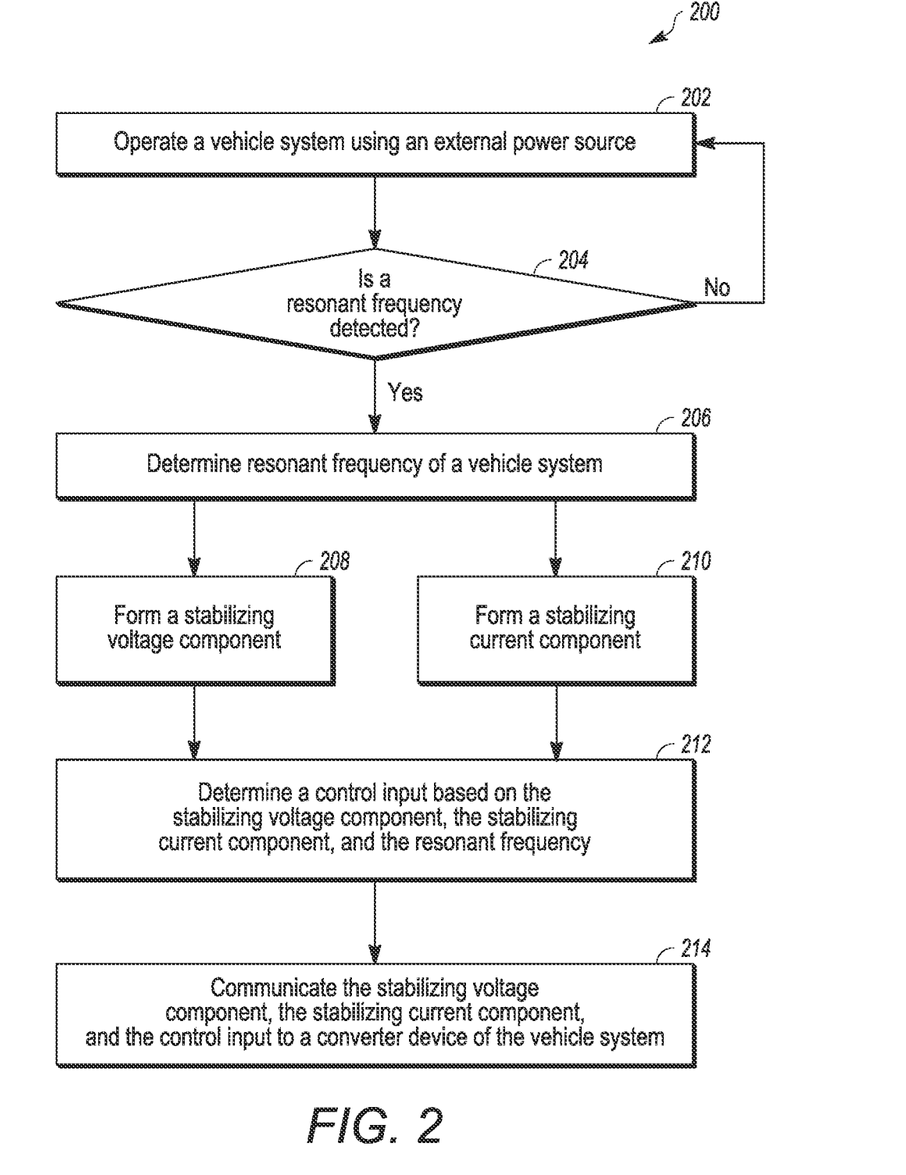
FIG. 2 illustrates a flowchart of one example of a method for controlling a resonant frequency of the vehicle system in accordance with one embodiment.

FIG. 2 illustrates a flowchart of one example of a method 200 for changing and/or controlling the resonant frequency of the vehicle system in accordance with one embodiment. The method may be used in conjunction with one or more embodiments of the systems described herein. At 202, the vehicle system is operated using the external power source. For example, the external power source may provide voltage and current to the vehicle system to power one or more systems or devices of the vehicle system. For example, the voltage and the current may be received by the converter of the vehicle system, which may be an AC inverter, a DC-DC converter, a braking chopper, an electrified auxiliary blower, a passive or active rectifier, or the like. In one or more embodiments, the current and/or the voltage from the external power source may be estimated from other signals. Optionally, one or both of the current or voltage from the external power source may be measured directly, such as by a current sensor and/or a link voltage sensor.

At 204, a decision is made whether a resonant frequency is detected. The resonant frequency may be detected based on characteristics measured or otherwise sensed by the one or more sensors of the vehicle system. For example, the sensors may measure or otherwise sense a instability of the electrical power from the external power source (e.g., such as by using a phase-locked loop), may sense or detect car body oscillations, vehicle payload meter oscillations, truck seat oscillations, tire pressure bounce feedback, suspension position, pantograph spring bounce, or the like. If a resonant frequency is not detected, the method returns to 202.

Flow of the method may continue while the vehicle system is electrically coupled to the external power source, according to a predetermined schedule of operation (e.g., continuously, every second, every minute, every 30 minutes, every hour, or the like), according to predetermined criteria (e.g., responsive to another vehicle being electrically coupled with and/or disconnected from the external power source, responsive to a setting of the propulsion system changing, responsive to the grade of the route changing according to a predetermined threshold, or the like), based on a position of one or more vehicle systems along the route, at the start of a vehicle system being electrically coupled with the external power source, or the like. Optionally, the method may be conducted on-demand. For example, an operator onboard the vehicle system (and/or an operator off-board the vehicle system) may manually control the controller to determine the resonant frequency of the vehicle system.

Figure 4:
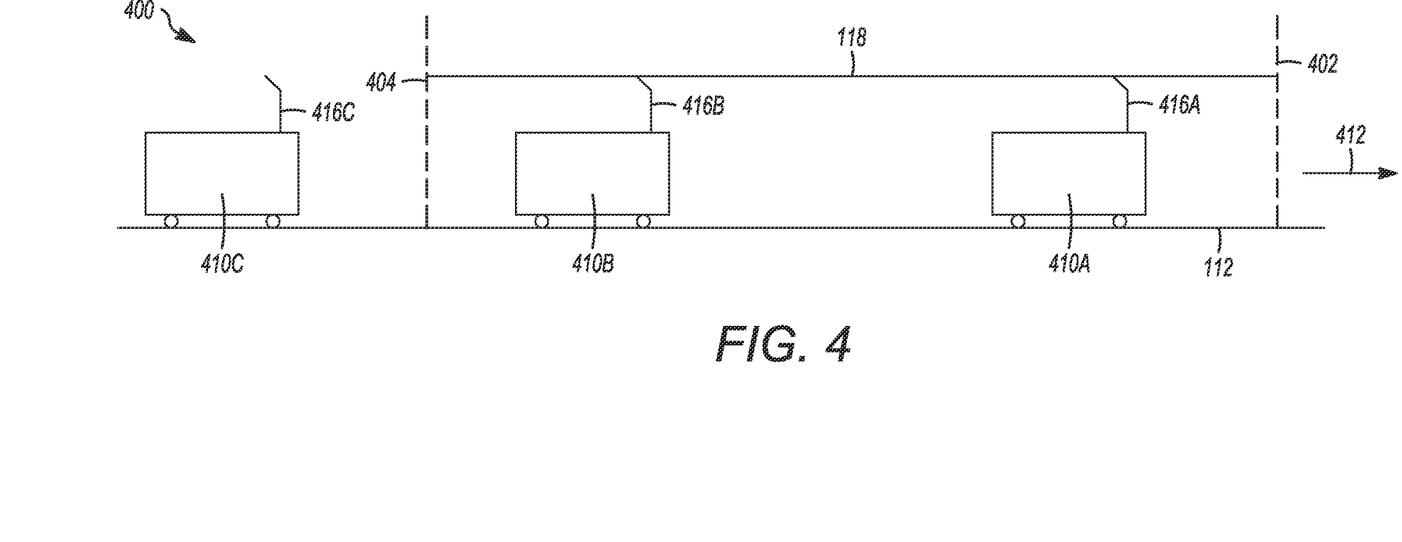
FIG. 4 illustrates a system in accordance with one embodiment.

For example, FIG. 4 illustrates one example of a system 400 in accordance with one embodiment. In the illustrated embodiment of FIG. 4, the external power source 118 extends between a first end 402 and a second end 404 along the route. A first vehicle system 410A and a second vehicle system 410B are electrically coupled with the external power source via pantographs 416A, 416B, respectively. A third vehicle system 410C is disconnected from the external power source. For example, the third vehicle system may be powered by an alternative power source onboard the third vehicle system, and may be powered by the external power source as the third vehicle system moves in a direction 412 along the route and between the first and second ends of the external power source. As the vehicle systems move in the direction 412 along the route, the resonant frequency detected by the second vehicle system may change responsive to the first vehicle system disconnecting from the external power source, and responsive to the third vehicle system connecting to the external power source. The method 200 may continue responsive to the vehicle system 416A disconnecting from the external power source, responsive to the vehicle system 416C electrically connecting to the external power source, or the like.

Figure 5:
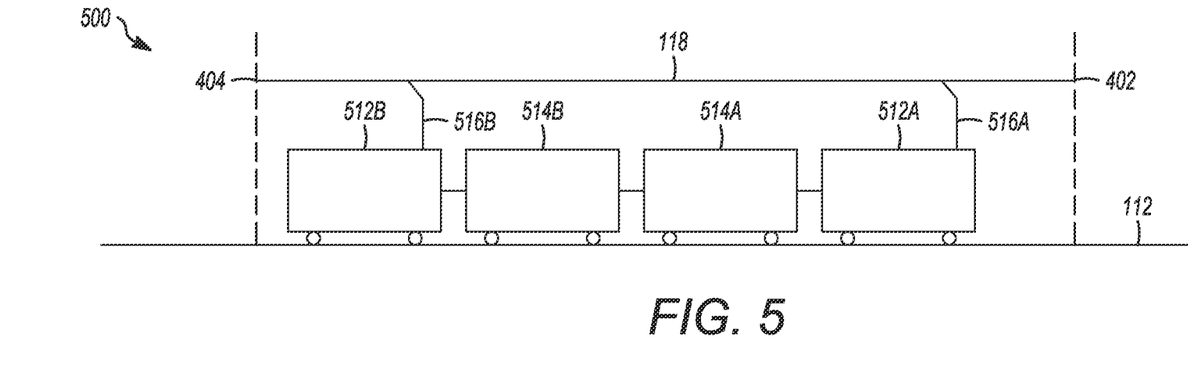
FIG. 5 illustrates a system in accordance with one embodiment.

As another example, FIG. 5 illustrates a system 500 of a vehicle consist including plural vehicles 512, 514 that move together along the route. The vehicle systems 512A, 512B may be propulsion generating vehicles, and the vehicles 514A, 514B may be non-propulsion generating vehicles. Optionally, the vehicle consist may include any number of propulsion generating vehicles and/or any number of non-propulsion generating vehicles in any arrangement. The vehicle systems 512A, 512B are electrically coupled with the external power source via pantographs 516A, 516B, respectively. As the vehicle consist moves along the route, the resonant frequency may be detected by the vehicle systems 512A and/or 512B. The resonant frequency may be detected responsive to one of the vehicle systems 512A, 512B disconnecting from the external power source, responsive to both vehicle systems 512A, 512B disconnecting from the external power source, responsive to another vehicle system connecting to the external power source, or the like.

Returning to FIG. 2, if the resonant frequency is detected at 204, flow of the method proceeds toward 206. At 206, the resonant frequency of the vehicle system is determined. In one or more embodiments, the controller onboard the vehicle system may determine the resonant frequency based on signal input received from the one or more sensors. Optionally, a controller off-board the vehicle system may determine the resonant frequency. In one or more embodiments, a source of the resonant frequency may be determined along with the resonant frequency. For example, the controller may determine the resonant frequency of the vehicle system and may determine that a blower motor inverter of the vehicle system is the source of the resonant frequency. Optionally, the controller may determine that two different systems or devices of the vehicle system are the sources of the resonant frequency.

Figure 3:
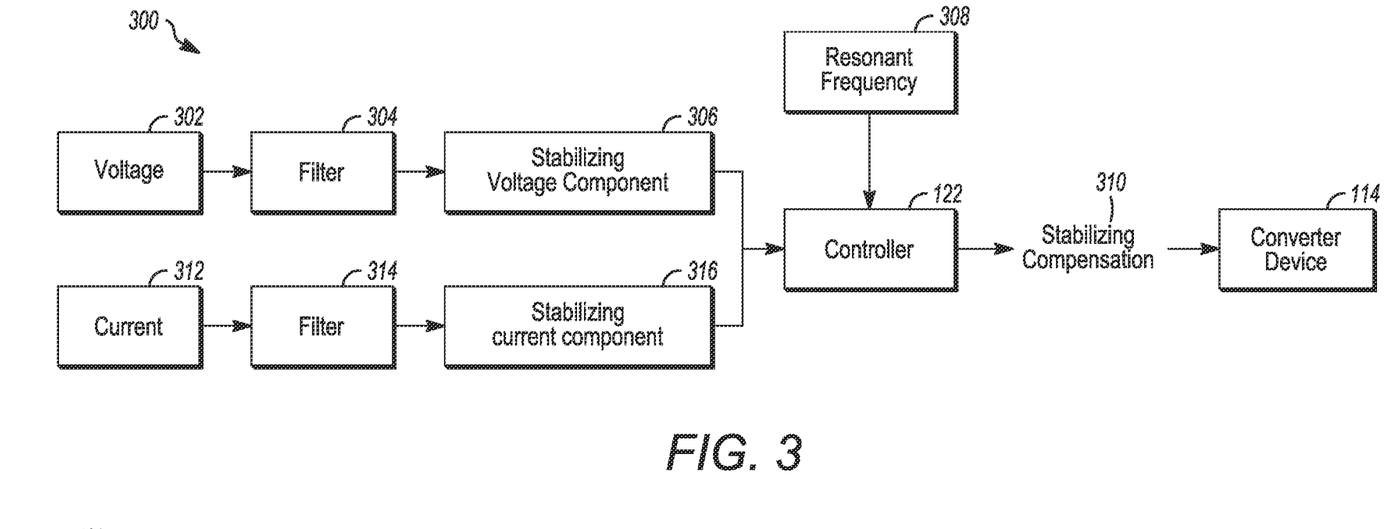
FIG. 3 illustrates an electrical schematic flowchart of the vehicle system shown in FIG. 1 in accordance with one embodiment.

At 208, a stabilizing voltage component is formed from the voltage of the external power source. Additionally, at 210, a stabilizing current component is formed from the current of the external power source. The stabilizing voltage component and the stabilizing current component may be formed substantially simultaneously, or alternatively the stabilizing components may be formed at different moments in time. FIG. 3 illustrates one example of an electrical schematic 300 of the vehicle system that may be used to form the stabilizing voltage and current components. The voltage and current from the external power source may be directed through plural filters, such as band pass filters, of the controller to change one or more characteristics of the voltage and current, respectively.

For example, at 302, the voltage from the external power source is provided to a first filter 304. The first filter extracts a phase and/or frequency component from the voltage to use in order to generate the stabilizing voltage component at 306 (e.g., to generate a stabilizing voltage feedback component). Additionally, at 312, the current from the external power source is provided to a second filter 314. The second filter extracts a phase and/or frequency component from the current to generate the stabilizing current component at 316 (e.g., to generate a stabilizing current feedback component). The first and second filters may introduce phase shifts in the voltage and the current feedback components such that the overall stabilizing voltage component and the stabilizing current component are out of phase with the true system dynamics. For example, the phase of the stabilizing voltage component may be 90 degrees out of phase with the phase of the stabilizing current component. Optionally, the stabilizing voltage component may be 45 degrees out of phase with the stabilizing current component, may be 15 degrees out of phase with each other, or the like.

In one or more embodiments, the controller may include one or more processors that may generate the stabilizing voltage component and/or the stabilizing current component by alternative methods. For example, the one or more processors of the controller (or processors off-board the vehicle system) may determine the stabilizing voltage component and stabilizing current component by using a fast Fourier transform (FFT) calculation to determine the frequency of resonance. Since the range of resonance frequency is known ahead of time (e.g., between 10 and 30 Hz), an FFT can determine the actual frequency (e.g., 22.5 Hz). Once the frequency is determined, a common method to keep track of the frequency (e.g., since the frequency generally moves) using standard phase lock loop.

In one or more embodiments, the controller may change one or more settings of the first filter and/or the second filter based on the resonant frequency of the vehicle system. For example, one or more of the filters may be tuned or calibrated for performance and/or control loop dynamics based on the detected resonant frequency, based on historical performance data of the vehicle system, based on an amount of power provided by the external power source, or the like.

The first and second filters may form the stabilizing voltage and current components. The stabilizing voltage and current components may be directed to the controller onboard the vehicle system. The controller may receive the stabilizing voltage and current components, and the detected resonant frequency. Returning to FIG. 2, at 212, the controller determines a control input based on the stabilizing voltage component, the stabilizing current component, and the detected resonant frequency. For example, the controller (or an off-board controller) may determine the control input based on both the voltage and current of the external power source.

In one or more embodiments, the control input may have a magnitude and/or a phase delay that may counteract or interact with, interfere with, act against, or the like, the magnitude and/or phase of the frequency of the detected resonance. For example, the stabilizing voltage component and the stabilizing current component may form a vector that changes or offsets a phase lag induced by at least one of the plural filters. The control input together with the stabilizing voltage component, the stabilizing current component, and based on the resonant frequency, forms a responsive frequency, a stabilizing compensation frequency, stabilizing compensation value, or the like. For example, a vector sum of the stabilizing voltage component and the stabilizing current component enables feedback stabilizing, changes a phase lag from at least one of the filters, from a torque regulator, or the like.

In one or more embodiments, the control input may be one or more operational settings of the vehicle system. For example, the control input may change a torque generated by a drive system or propulsion system of the vehicle system. Optionally, the control input may be a speed for a blower of the vehicle system. Optionally, the control input may be a secondary link voltage of the converter device. The control input may be used in general for stabilization based on traction induced resonance, but alternatively may be used for non-traction induced resonance. For example, in one or more embodiments, the stabilizing component of the control unit may be in the form of chopper actuation or alternative power source modulation (e.g., such as by using a DC to DC converter to dampen resonant frequencies). Optionally, oscillations may occur based on disturbances between a battery charging infrastructure electrically coupled with the external power source. Optionally, the control input may be a power setting, a voltage, a current speed, or any other setting of any alternative system, device, or component of the vehicle system.

At 214, the stabilizing compensation including the stabilizing voltage component, the stabilizing current component, and the control input are communicated or otherwise directed to the converter device of the vehicle system. The control input may be determined to change, minimize, reduce, dampen, correct, or the like, the frequency of the detected resonance, relative to a control input that is determined based on one of the voltage or the current of the external power source. As illustrated in FIG. 3, the stabilizing compensation is directed to the converter device. The stabilizing compensation interacts or interferes with the current and voltage from the external power source to control a magnitude and/or phase angle of an output of the converter device. For example, the control input, the stabilizing voltage component, and the stabilizing current component generate a responsive frequency that counteracts the resonant frequency of the vehicle system to change the resonant frequency of the vehicle system.

In one or more embodiments, the controller may communicate the stabilizing voltage component, the stabilizing current component, and the control input with another vehicle system. For example, the second vehicle system may be operably coupled with the external power source, and may be experiencing a resonant frequency. The first vehicle system may comprise the plural filters to form the stabilizing voltage and current components, and may communicate the stabilizing voltage and current components, and determined control input to the second vehicle system.

In one or more embodiments, the controller may store the stabilizing voltage and current components, the control input, and determination factors in the memory onboard the vehicle system. For example, the controller may store data associated with the determining resonant frequency (e.g., time, date, and/or location of the vehicle system when the resonant frequency was determined; a source of the resonant frequency; the determined control input; or the like). The data may be analyzed and/or reviewed after the vehicle system reaches a destination, is decoupled from the external power source, or the like. In one or more embodiments, the controller may communicate the stored data to an off-board database, such as a back office server, that may collect and/or compare data from plural different vehicle systems.

Figure 6:
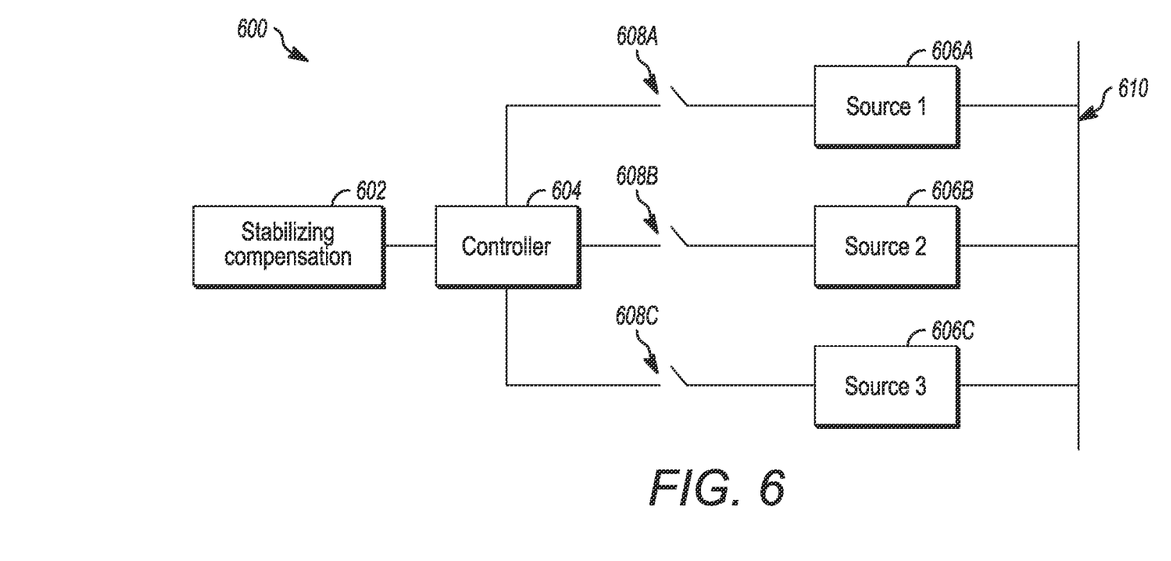
FIG. 6 illustrates a system for delegating stabilizing feedback toward a resonant frequency source in accordance with one embodiment.

In one or more embodiments, the controller may determine a delegation of where the determined responsive frequency or stabilizing compensation may be directed. For example, FIG. 6 illustrates a system 600 for delegating stabilizing feedback toward a resonant frequency source in accordance with one embodiment. A controller 604 is electrically coupled with plural different converter sources 606 via plural switches 608. As one example, a first source 606A may represent an AC traction inverter, a second source 606B may represent a blower motor inverter, and a third source 606C may represent a DC-DC converter. The plural different sources may be electrically coupled with a shared electrical bus 610, such as a catenary or the like.

The controller may determine a control input based on a stabilizing voltage component, a stabilizing current component, and a detected resonant frequency, and based on the source of the resonant frequency. For example, the controller may determine which of the plural sources is generating the resonant frequency, and may determine the control input to change the resonant frequency of the source generating the resonant frequency. The controller may control operation of the plural switches 608 to control which of the sources receives a stabilizing compensation 602 to counteract or interact with the resonant frequency to change the resonant frequency of the vehicle system. For example, the controller may switch where the stabilizing compensation is applied. The controller may determine where the stabilizing compensation is applied based on different operating states of the plural sources, operating modes or states of the vehicle system, based on a resonant frequency generated by a first source relative to a resonant frequency generated by a second source, or the like.

Figure 7:
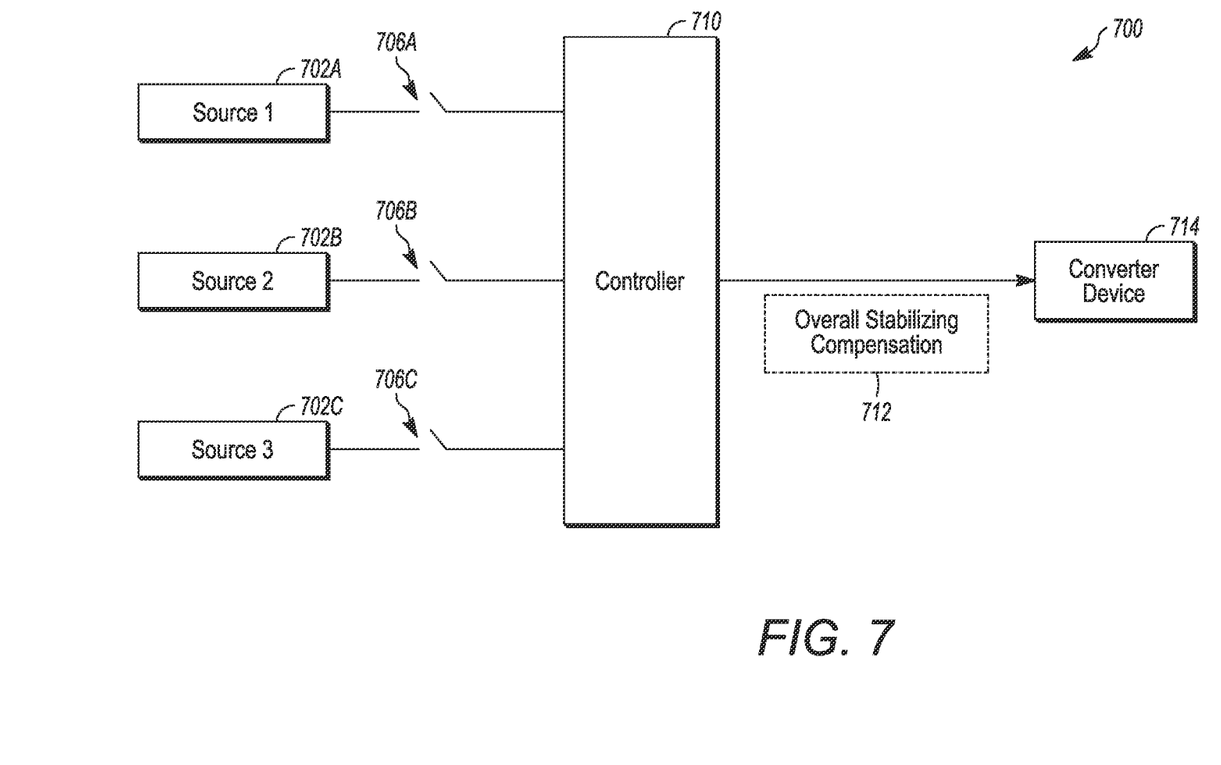
FIG. 7 illustrates a system for determining a stabilizing compensation to dampen resonant frequencies from one or more sources in accordance with one embodiment.

In one or more embodiments, the controller may determine a stabilizing compensation for multiple resonant frequencies. For example, FIG. 7 illustrates a system 700 for determining a stabilizing compensation to counteract resonant frequencies from plural different sources in accordance with one embodiment. A controller 710 is electrically coupled with plural sources 702. The plural sources can represent sources of detected resonant frequencies. For example, a first source 702A may represent tire suspension bounce resonance, a second source 702B may represent pantograph bounce resonance, and a third source 702C may represent vehicle seat bounce resonance. The plural sources may be sources of different resonances. The controller may be electrically coupled with each of the plural sources by plural switches 706. The controller may control operation of each of the switches 706A-C to control which source the controller is electrically coupled with. The controller may receive each of the individual resonances, and may determine a superimposed overall control input stabilizing compensation 712 to change the multiple different resonances. The controller may communicate the overall stabilizing compensation to a converter device 714 to counteract all of the detected resonant frequencies.

In one or more embodiments, the vehicle system may be operably and/or communicatively coupled with a back-office server (not shown) of a positive vehicle control (PVC) system or a positive control system (PCS). The back-office server may be a vital or a non-vital system such that data stored, contained, maintained, communicated between, or the like, may be vital (e.g., protected) and/or non-vital (e.g., non-protected) data. The back-office server may remotely control brake settings of the brake system and propulsion settings of a propulsion system (e.g., including the shaft) of the vehicle system. Optionally, the back-office server may remotely control operation of the controller to determine the control input of the converter device based on the resonant frequency and the stabilizing voltage and current components. The PCS system may control which vehicle of a vehicle system (not shown) is allowed to move and/or is allowed to move outside a designated restricted manner (such as above a designated penalty speed limit), only responsive to receipt or continued receipt of one or more signals (e.g., signals received from off-board the vehicle system) that meet designated criteria, e.g., the signals have designated characteristics (e.g., a designated waveform and/or content) and/or are received at designated times (or according to other designated time criteria) and/or under designated conditions. Alternatively, in a 'negative' control system (NCS), a vehicle may be allowed to move unless a signal (restricting movement) is received. For example, in a PCS, vehicles have onboard systems that prevent the vehicles from performing one or more operations unless a signal is received from an off-board source granting permission to perform the operation, and in a NCS, vehicles may include onboard systems that allow the vehicle to perform the one or more operations unless a signal is received from an off-board source prohibiting the performance of the one or more operations.

Figure 8:
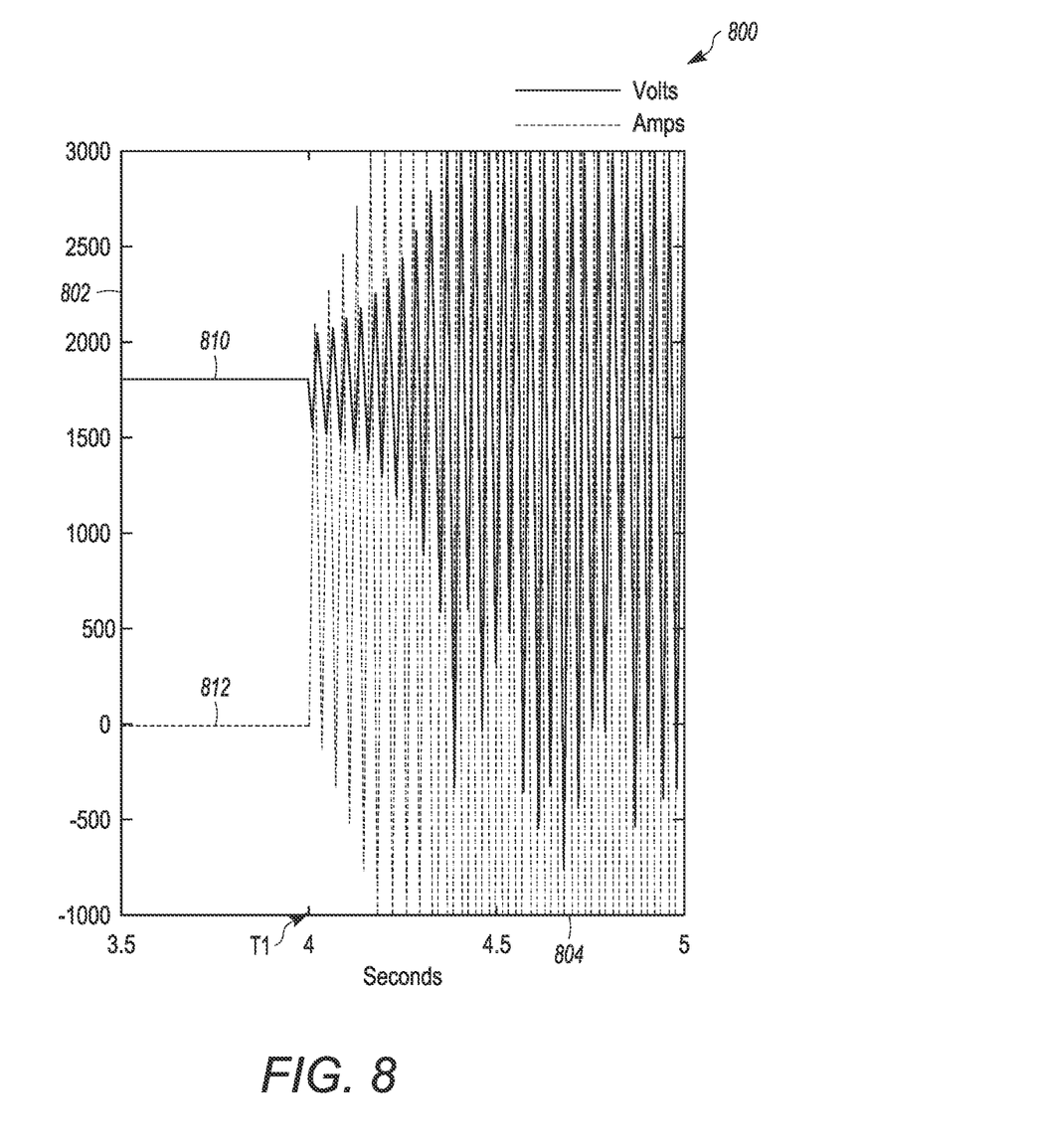
FIG. 8 illustrates a graphical representation of resonant frequencies in accordance with one embodiment.

FIG. 8 illustrates a graph 800 of measured voltage and current from the external power source in accordance with one embodiment. The graph is illustrated having a horizontal axis 804 representing time and a vertical axis 802 representing amplitude. A first data line 810 illustrates voltage measured by a voltage sensor onboard the vehicle system. A second data line 812 illustrates current measured by a current sensor onboard the vehicle system. At a time T1, the voltage and the current become increasingly unstable. For example, at the time T1, another vehicle may have electrically coupled with the external power source, another vehicle may have electrically decoupled from the external power source, or the like. For example, at the time T1, the voltage and current sensors detect a resonant frequency of the vehicle system.

Figure 9:
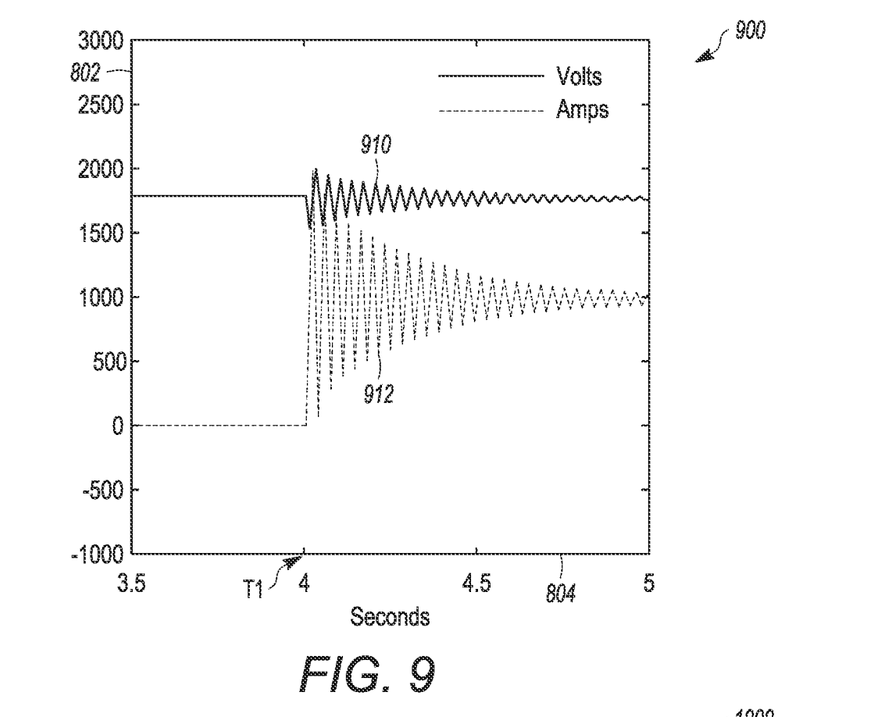
FIG. 9 illustrates a graphical representation of dampening resonant frequencies with a responsive frequency having a stabilizing voltage component in accordance with one embodiment.

FIG. 9 illustrates a graph 900 of measured voltage and current from the external power source in accordance with one embodiment. The graph is illustrated along the same horizontal axis representing time and vertical axis representing amplitude. A first data line 910 illustrates voltage measured by the voltage sensor onboard the vehicle system, and a second data line 912 illustrates current measured by the current sensor onboard the vehicle system. Like the graph 800, the graph 900 illustrates that at the time T1, the voltage and current become unstable. In the illustrated embodiment of FIG. 9, the resonant frequency is dampened or counteracted with by forming a stabilizing voltage component. For example, by using a filter to form a stabilizing voltage component, and determine a control input based on the stabilizing voltage component, the controller may change the resonant frequency of the vehicle system. The graph 900 indicates that determining the control input based on the stabilizing voltage component reduces the resonant frequency over time, relative to the graph 800 that indicates the resonant frequency remaining unchanged over time.

Figure 10:
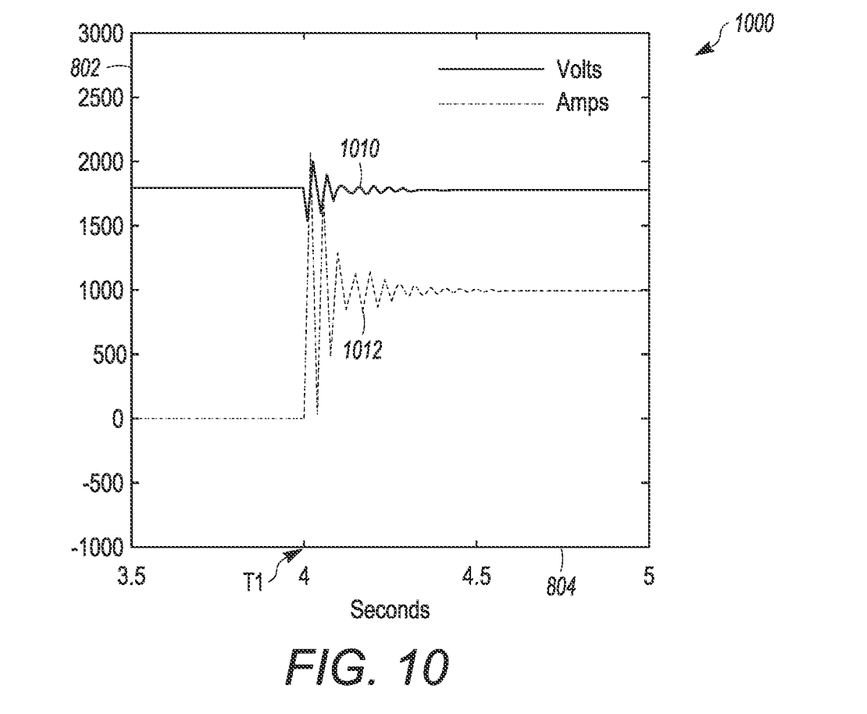
FIG. 10 illustrates a graphical representation of dampening resonant frequencies with a responsive frequency having a stabilizing voltage component and a stabilizing current component in accordance with one embodiment.

FIG. 10 illustrates a graph 1000 of measured voltage and current from the external power source in accordance with one embodiment. Like the graphs 800 and 900, the graph 1000 is illustrated along the same horizontal and vertical axes. A first data line 1010 illustrates voltage measured by the voltage sensor, and a second data line 1012 illustrates current measured by the current sensor. Like the graphs 800 and 900, the graph 1000 illustrates that at the time T1, the voltage and current become unstable. In the illustrated embodiment of FIG. 10, the resonant frequency is dampened or counteracted with by forming the stabilizing voltage component and forming the stabilizing current component. For example, unlike the graph shown in FIG. 9, the resonant frequency shown in FIG. 10 is changed by forming the stabilizing voltage and current components, and determining the control input for the converter device based on both the stabilizing voltage component and the stabilizing current component. For example, the stabilizing voltage component, the stabilizing current component, and the control input may change the resonant frequency of the vehicle system when the converter is operator according to the stabilizing voltage component, the stabilizing current component, and the control input. The graph 1000 indicates that determining the control input based on the stabilizing voltage component and based on the stabilizing current component reduces or dampens the resonant frequency faster than when the control input is based on just the stabilizing voltage component.

In one embodiment, the control system may have a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the control system may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via backpropagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

In one or more embodiments of the subject matter described herein, a method includes determining a resonant frequency of a vehicle system operably coupled with an external power source. The external power source may provide voltage and current to the vehicle system. A stabilizing voltage component is formed from the voltage and a stabilizing current component is formed from the current using plural filters. A first filter extracts one or more of a phase or a frequency component from the voltage provided by the external power source to generate the stabilizing voltage component. A second filter extracts one or more of a phase or a frequency component from the current provided by the external power source to generate the stabilizing current component. The stabilizing voltage component is out of phase with the stabilizing current component. A control input of a converter device of the vehicle system is determined based on the stabilizing voltage component, the stabilizing current component, and the resonant frequency. The stabilizing voltage component, the stabilizing current component, and the control input are communicated with the converter device. The stabilizing voltage component, the stabilizing current component, and the control input change the resonant frequency of the vehicle system.

Optionally, the stabilizing voltage component is 90 degrees out of phase with the stabilizing current component.

Optionally, the method includes operating a drive system of the vehicle system with the external power source.

Optionally, the method includes changing one or more settings of one or more of the plural filters based on the resonant frequency of the vehicle system.

Optionally, the stabilizing voltage component, the stabilizing current component, and the control input may be communicated with another vehicle system operably coupled with the external power source.

Optionally, the vehicle system may be a hybrid vehicle system configured to be powered by the external power source or an alternative fuel.

Optionally, the stabilizing voltage component and the stabilizing current component form a vector configured to change or offset a phase lag induced by at least one of the plural filters.

Optionally, the resonant frequency of the vehicle system is determined responsive to another vehicle system being operably coupled with or decoupled from the external power source.

Optionally, the control input may control one or more operational settings of the vehicle system.

Optionally, the control input may change a torque generated by a drive system of the vehicle system.

Optionally, the control input may be determined based on the stabilizing voltage component, the stabilizing current component, and the resonant frequency such that the control input, the stabilizing voltage component, and the stabilizing current component generate a responsive frequency configured to counteract with the resonant frequency of the vehicle system to change the resonant frequency of the vehicle system.

In one or more embodiments of the subject matter described herein, a control system includes a sensor configured to detect a resonant frequency of a vehicle system operably coupled with an external power source. The external power source provides voltage and current to the vehicle system. Plural filters are configured to form a stabilizing voltage component from the voltage and a stabilizing current component from the current. A first filter of the plural filters extracts one or more of a phase or a frequency component from the voltage provided by the external power source to generate the stabilizing voltage component. A second filter of the plural filters extracts one or more of a phase or a frequency component from the current provided by the external power source to generate the stabilizing current component. The stabilizing voltage component is out of phase with the stabilizing current component. One or more processors are configured to determine a control input of a converter device of the vehicle system based on the stabilizing voltage component, the stabilizing current component, and the resonant frequency. The one or more processors communicate the stabilizing voltage component, the stabilizing current component, and the control input with the converter device of the vehicle system. The stabilizing voltage component, the stabilizing current component, and the control input change the resonant frequency of the vehicle system.

Optionally, the stabilizing voltage component is 90 degrees out of phase with the stabilizing current component.

Optionally, the external power source may provide power to the vehicle system to operate a drive system of the vehicle system.

Optionally, one or more settings of one or more of the first or second filters may change based on the resonant frequency of the vehicle system.

Optionally, the one or more processors may communicate the stabilizing voltage component, the stabilizing current component, and the control input with another vehicle system operably coupled with the external power source.

Optionally, the vehicle system may be a hybrid vehicle system configured to be powered by the external power source or an alternative fuel.

Optionally, the stabilizing voltage component and the stabilizing current component form a vector configured to change or offset a phase lag induced by at least one of the plural filters.

Optionally, the sensor may detect the resonant frequency of the vehicle system responsive to another vehicle system being operably coupled with or decoupled from the external power source.

Optionally, the control input may control one or more operational settings of the vehicle system.

Optionally, the control input may control a torque generated by a drive system of the vehicle system.

Optionally, the one or more processors may determine the control input based on the stabilizing voltage component, the stabilizing current component, and the resonant frequency such that the control input, the stabilizing voltage component and the stabilizing current component generate a responsive frequency configured to counteract with the resonant frequency of the vehicle system to change the resonant frequency of the vehicle system.

In one or more embodiments of the subject matter described herein, a method includes determining a resonant frequency of a vehicle system operably coupled with an external power source. The external power source provides voltage and current to the vehicle system. A stabilizing voltage component is formed from the voltage and a stabilizing current component is formed from the current using plural filters. A first filter extracts one or more of a phase or a frequency component of the voltage provided by the external power source to generate the stabilizing voltage component. A second filter extracts one or more of a phase or a frequency component of the current provided by the external power source to generate the stabilizing current component. The stabilizing voltage component is 90 degrees out of phase with the stabilizing current component. A control input of a converter device of the vehicle system is determined based on the stabilizing voltage component, the stabilizing current component, and the resonant frequency. The stabilizing voltage component, the stabilizing current component, and the control input are communicated with the converter device. The stabilizing voltage component, the stabilizing current component, and the control input generate a responsive frequency configured to counteract with the resonant frequency of the vehicle system to change the resonant frequency of the vehicle system.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
    determining a resonant frequency of a vehicle system operably coupled with an external power source, the external power source configured to provide voltage and current to the vehicle system;
    forming a stabilizing voltage component from the voltage and a stabilizing current component from the current using plural filters, a first filter of the plural filters configured to extract one or more of a phase or a frequency component from the voltage provided by the external power source to generate the stabilizing voltage component, a second filter of the plural filters configured to extract one or more of a phase or a frequency component from the current provided by the external power source to generate the stabilizing current component, wherein the stabilizing voltage component is out of phase with the stabilizing current component;
    determining a control input of a converter device of the vehicle system based on the stabilizing voltage component, the stabilizing current component, and the resonant frequency; and
    communicating the stabilizing voltage component, the stabilizing current component, and the control input with the converter device, the stabilizing voltage component, the stabilizing current component, and the control input configured to change the resonant frequency of the vehicle system.

2. The method of claim 1, wherein the stabilizing voltage component is 90 degrees out of phase with the stabilizing current component.

3. The method of claim 1, further comprising operating a drive system of the vehicle system with the external power source.

4. The method of claim 1, further comprising changing one or more settings of one or more of the plural filters based on the resonant frequency of the vehicle system.

5. The method of claim 1, further comprising communicating the stabilizing voltage component, the stabilizing current component, and the control input with another vehicle system operably coupled with the external power source.

6. The method of claim 1, wherein the stabilizing voltage component and the stabilizing current component form a vector configured to change or offset a phase lag induced by at least one of the plural filters.

7. The method of claim 1, wherein the resonant frequency of the vehicle system is determined responsive to another vehicle system being operably coupled with or decoupled from the external power source.

8. The method of claim 1, wherein the control input changes a torque generated by a drive system of the vehicle system.

9. The method of claim 1, wherein the control input is determined based on the stabilizing voltage component, the stabilizing current component, and the resonant frequency such that the control input, the stabilizing voltage component, and the stabilizing current component generate a responsive frequency configured to counteract the resonant frequency of the vehicle system to change the resonant frequency of the vehicle system.

10. A control system comprising:
    a sensor configured to detect a resonant frequency of a vehicle system operably coupled with an external power source, the external power source configured to provide voltage and current to the vehicle system;
    plural filters configured to form a stabilizing voltage component from the voltage and a stabilizing current component of the current, a first filter of the plural filters configured to extract one or more of a phase or a frequency component from the voltage provided by the external power source to generate the stabilizing voltage component, a second filter of the plural filters configured to extract one or more of a phase or a frequency component from the current provided by the external power source to generate the stabilizing current component, wherein the stabilizing voltage component is out of phase with the stabilizing current component; and
    one or more processors configured to determine a control input of a converter device of the vehicle system based on the stabilizing voltage component, the stabilizing current component, and the resonant frequency,
    wherein the one or more processors are configured to communicate the stabilizing voltage component, the stabilizing current component, and the control input with the converter device of the vehicle system, wherein the stabilizing voltage component, the stabilizing current component, and the control input are configured to change the resonant frequency of the vehicle system.

11. The control system of claim 10, wherein the stabilizing voltage component is 90 degrees out of phase with the stabilizing current component.

12. The control system of claim 10, wherein the external power source is configured to provide power to the vehicle system to operate a drive system of the vehicle system.

13. The control system of claim 10, wherein one or more settings of one or more of the first filter or the second filter are configured to change based on the resonant frequency of the vehicle system.

14. The control system of claim 10, wherein the one or more processors are configured to communicate the stabilizing voltage component, the stabilizing current component, and the control input with another vehicle system operably coupled with the external power source.

15. The control system of claim 10, wherein the vehicle system is a hybrid vehicle system configured to be powered by at least one of the external power source or a fuel.

16. The control system of claim 10, wherein the stabilizing voltage component and the stabilizing current component form a vector configured to change or offset a phase lag induced by at least one of the plural filters.

17. The control system of claim 10, wherein the sensor is configured to detect the resonant frequency of the vehicle system responsive to another vehicle system being operably coupled with or decoupled from the external power source.

18. The control system of claim 10, wherein the control input controls a torque generated by a drive system of the vehicle system.

19. The control system of claim 10, wherein the one or more processors are configured to determine the control input based on the stabilizing voltage component, the stabilizing current component, and the resonant frequency such that the control input, the stabilizing voltage component, and the stabilizing current component generate a responsive frequency configured to counteract the resonant frequency of the vehicle system to change the resonant frequency of the vehicle system.

20. A method comprising:
determining a resonant frequency of a vehicle system operably coupled with an external power source, the external power source configured to provide voltage and current to the vehicle system;
forming a stabilizing voltage component from the voltage and a stabilizing current component from the current using plural filters, a first filter of the plural filters configured to extract one or more of a phase or a frequency component of the voltage provided by the external power source to generate the stabilizing voltage component, a second filter of the plural filters configured to extract one or more of a phase or a frequency component of the current provided by the external power source to generate the stabilizing current component, wherein the stabilizing voltage component is 90 degrees out of phase with the stabilizing current component;
determining a control input of a converter device of the vehicle system based on the stabilizing voltage component, the stabilizing current component, and the resonant frequency; and
communicating with the converter device the stabilizing voltage component, the stabilizing current component, and the control input, wherein the stabilizing voltage component, the stabilizing current component, and the control input are configured to generate a responsive frequency configured to interact with the resonant frequency of the vehicle system to change the resonant frequency of the vehicle system.

\* \* \* \* \*